July 28, 1931.   H. CORDY   1,816,143
LANDING GEAR FOR AEROPLANES
Filed Dec. 17, 1929

INVENTOR.
HARRY CORDY
BY
ATTORNEYS.

Patented July 28, 1931

1,816,143

UNITED STATES PATENT OFFICE

HARRY CORDY, OF LOS ANGELES, CALIFORNIA

LANDING GEAR FOR AEROPLANES

Application filed December 17, 1929. Serial No. 414,742.

My invention relates to landing gears for aeroplanes, and it has for a purpose the provision of a landing gear which is characterized by its ability to absorb the force of impact produced as a result of the landing wheels striking the ground, and consequently the resultant jars in their transmission to the fuselage of the aeroplane to the extent of preventing damage to the landing gear and fuselage particularly in the event of a bad landing, and to protect the occupants against being shocked or jarred.

I will describe only one form of landing gear embodying my invention, and will then point out the novel features thereof in claims.

Figure 1:
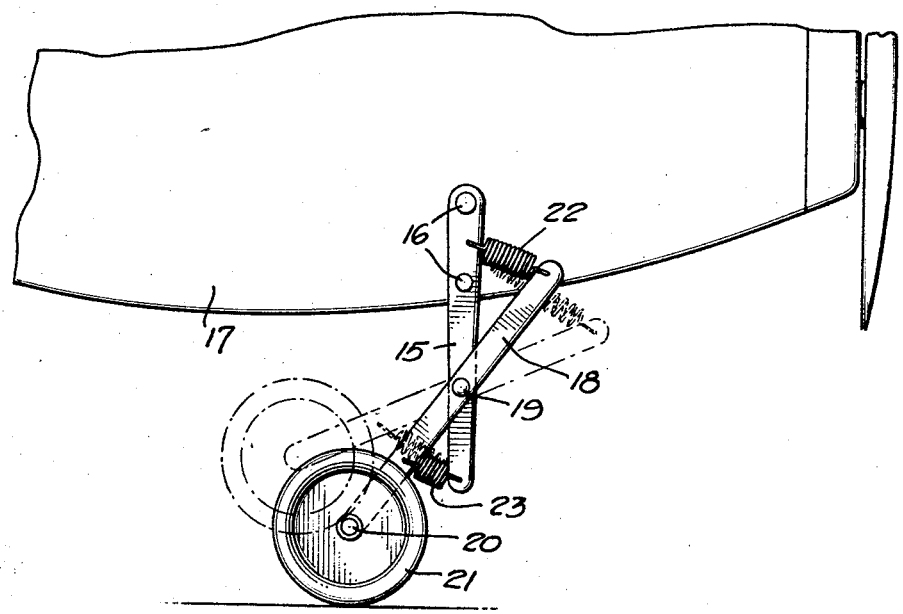
Fig. 1 is a view showing in side elevation a portion of an aeroplane fuselage having applied thereto one form of landing gear embodying my invention.
Figure 2:
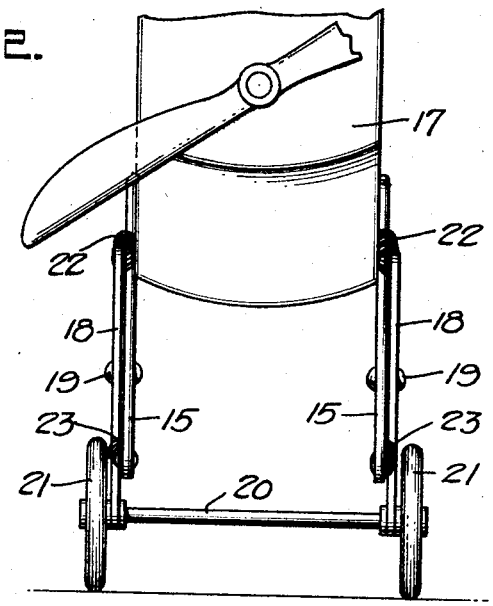
Fig. 2 is a view showing the fuselage and landing gear in front elevation.

In carrying out my invention, I provide a support which is adapted to be associated with the forward part of a fuselage so as to extend downwardly therefrom, this support, in the present instance, comprising a pair of vertically disposed struts 15 secured at their upper ends as indicated at 16 to the opposite sides of a fuselage 17. The struts 15 provide a mounting for a pair of arms 18 pivoted as at 19 to swing about horizontal axes. The pivots 19 are between the ends of the struts 15 as well as between the ends of the arms 18.

These arms 18 are connected at their lower ends by an axle 20, and mounted on the ends of the axle at the outer sides of the arms are a pair of wheels 21. These wheels are of the conventional type and, as usual, are provided with rubber tires. Thus, through the medium of the arms 18, the wheels 21 are mounted to swing bodily upwardly and downwardly.

Springs 22 and 23 of the contractile type are connected, respectively, to the upper ends of the arms 18 and the struts 15, and to the lower ends of the struts 15 and to the arms 18. The springs 22 function to urge the upper ends of the arms 18 upwardly, while the springs 23 being below the pivots 19 serve to urge the lower ends of the arms downwardly. Thus the two sets of springs coact to yieldably urge the arms in a clockwise direction about their pivots and to thereby urge the wheels 21 downwardly. The tension of the springs is such that normally the wheels 21 occupy the solid line position shown in Fig. 1 to provide an effective and rigid support for the fuselage. However, under the force of impact as a result of the wheels striking the ground as when the aeroplane is landing, the springs will yield to allow the arms to swing about their pivots 19 so that the wheels move upwardly. Under this action the force of impact is not transmitted to the fuselage but is absorbed so as to prevent the resultant strain, stresses and jars being transmitted to the fuselage. Furthermore, the landing gear itself is protected from damage under the yielding movement of the arms 18 by reason of their mounting operating in conjunction with the springs 22 and 23.

Although I have herein shown and described only one form of landing gear embodying my invention, it is to be understood that various changes and modifications may be made herein without departing from the spirit of the invention and the spirit and scope of the appended claims.

I claim:

1. A landing gear for aeroplanes comprising a fixed support, a pair of arms pivoted on the support to swing about horizontal axes, wheels carried by the arms, and springs connected to the arms and to the support at opposite sides of the axes of the arms so as to yieldably urge the arms in one direction about their axes.

2. A landing gear for aeroplanes comprising a pair of struts adapted to be fixed to a fuselage, a pair of arms pivoted on the struts, an axle carried by the arms, wheels on the axle, and springs connected to the arms and axle, and springs connected to the arms and to the struts at opposite sides of the pivots of the arms for yieldably urging the arms downwardly.

3. A landing gear for aeroplanes comprising a pair of struts adapted to be fixed to a fuselage, a pair of arms pivoted on the struts between the ends of the latter so as to swing about horizontal axes, an axle carried by the arms, wheels on the axle, and contractile springs connecting the struts and arms above and below the axes of the arms.

4. A landing gear for aeroplanes comprising a fixed support, an arm pivoted on the support, a wheel carried by the arms, and means connected to the arm and to the support at opposite sides of the pivot of the arm for yieldingly resisting movement of the arm in one direction about its pivot.

HARRY CORDY.